(12) United States Patent
Yamaguchi (10) Patent No.: US 7,614,412 B2
(45) Date of Patent: Nov. 10, 2009

(54) WASHER FLUID SPRAYING APPARATUS

(75) Inventor: Kazuyuki Yamaguchi, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 366 days.

(21) Appl. No.: 11/484,995

(22) Filed: Jul. 12, 2006

(65) Prior Publication Data
US 2007/0017559 A1    Jan. 25, 2007

(30) Foreign Application Priority Data
Jul. 13, 2005  (JP)  ............................. 2005-204462
Apr. 3, 2006  (JP)  ............................. 2006-101319

(51) Int. Cl.
*B08B 3/02*  (2006.01)

(52) U.S. Cl. ..................... 134/198; 239/284.1; 137/391

(58) Field of Classification Search ................ 134/198; 239/284.1; 137/391
See application file for complete search history.

(56) References Cited

U.S. PATENT DOCUMENTS

| | | | | |
|---|---|---|---|---|
| 2,016,867 A | * | 10/1935 | Marden | 137/172 |
| 2,114,558 A | * | 4/1938 | Dismukes | 15/250.01 |
| 2,266,930 A | * | 12/1941 | Watson | 137/420 |
| 2,582,819 A | * | 1/1952 | Daily | 137/399 |
| 2,770,017 A | * | 11/1956 | Oishei et al. | 239/284.1 |
| 2,934,082 A | * | 4/1960 | Gilliard et al. | 137/315.08 |
| 3,279,491 A | * | 10/1966 | Brady | 137/192 |
| 3,736,956 A | * | 6/1973 | Howard | 137/582 |
| 4,678,001 A | * | 7/1987 | Lacey | 137/194 |
| 4,728,260 A | * | 3/1988 | Ishii | 415/151 |
| 5,168,891 A | * | 12/1992 | Green et al. | 137/114 |
| 5,219,422 A | | 6/1993 | Sato | |
| 5,257,911 A | * | 11/1993 | Mota et al. | 417/63 |
| 6,402,052 B1 | * | 6/2002 | Murawa | 239/284.1 |
| 2005/0236496 A1 | * | 10/2005 | Lasebnick | 239/284.1 |

FOREIGN PATENT DOCUMENTS

| | | | |
|---|---|---|---|
| DE | 25 38 257 | * | 8/1975 |
| DE | 25 15 400 | * | 10/1976 |
| DE | 38 40 621 | * | 6/1990 |
| DE | 100 39 677 A1 | | 2/2002 |
| GB | 2 254 110 A | | 9/1992 |
| JP | 62-192965 | | 8/1987 |
| JP | 2005-075218 | | 3/2005 |

* cited by examiner

*Primary Examiner*—Frankie L Stinson
(74) *Attorney, Agent, or Firm*—Young Basile (57) ABSTRACT

In the present washer fluid spraying apparatus, when the amount of the remaining washer fluid in the tank is reduced, the buoyant force of the float does not have an effect to the valve member, and therefore the cross-sectional area of the flow passage of the valve member is reduced. Consequently spraying amount is limited compared to a case where there is a plenty of amount of remaining washer fluid. Therefore, compared to the structure that controls the washer pump driving status by detecting the remaining amount by a sensor, the driver of the vehicle can know that the amount of the remaining washer fluid in the tank is reduced while limiting the manufacturing costs.

6 Claims, 10 Drawing Sheets

WASHER FLUID SPRAYING APPARATUS

CROSS-REFERENCES TO RELATED APPLICATIONS

This application claims priority from Japanese Patent Application Serial Nos. 2005-204462 filed on Jul. 13, 2005 and 2006-101319 filed on Apr. 3, 2006, respectively, the contents of which are incorporated herein by reference in their entireties.

TECHNICAL FIELD

A washer fluid spraying apparatus that sprays washer fluid toward a windshield of a vehicle is described below.

BACKGROUND

Conventionally, a washer fluid spraying apparatus for a vehicle etc. that sprays the washer fluid stored in a tank to a windshield is known. In addition, such a washer fluid spraying apparatus alerts a driver with a warning light, etc., when the amount of remaining washer fluid in the tank decreases. Further, one known washer fluid spraying apparatus has a control apparatus that changes the spraying amount of the washer fluid so as to be different from that in a normal operation by intermittently driving a motor that drives a washer pump when the amount of the remaining washer fluid in the tank is decreased (for example, see Japanese Laid Open Utility Model Patent No. 62-192965). Another known washer fluid spraying apparatus includes a control apparatus that decreases the amount of the sprayed washer fluid according to the level of the remaining washer fluid when the amount of the remaining washer fluid in the tank is decreased (for example, see Japanese Laid Open Patent No. 2005-75218).

However, since in the above-mentioned prior art, the amount of the remaining washer fluid is electrically detected, and the washer pump is controlled according to the remaining amount, it is necessary to have electric parts such as a sensor that detects the amount of the remaining washer fluid, a control circuit that contains an amplifier harness that changes the amount of the sprayed washer pump, and a warning light, thereby increasing manufacturing costs.

SUMMARY

A washer fluid spraying apparatus allows a change in the amount of the sprayed washer fluid according to the amount of the remaining washer fluid with a low cost.

The washer fluid spraying apparatus comprises a float that changes a cross-sectional area of a flow passage of the washer fluid by controlling of a valve member using buoyancy, wherein when the amount of the remaining washer fluid in a tank decreases, the cross-sectional area of the flow passage is reduced compared to that in case where the amount of the remaining washer fluid is plentiful.

According to the washer fluid spraying apparatus, when the amount of the remaining washer fluid in the tank is reduced, the buoyancy of the float does not influence the valve, so that the cross-sectional area of the flow passage of the valve member is reduced. Consequently, the amount of the spraying is limited to a small amount compared to the case where the remaining washer fluid is sufficient. Therefore, compared to case the washer pump driving status is controlled by detecting the remaining amount by a sensor, the driver of the vehicle can know that the amount of the remaining washer fluid in the tank is reduced while limiting manufacturing costs.

BRIEF DESCRIPTION OF DRAWINGS

Other features and advantages of the present washer fluid spraying apparatus will be apparent from the ensuing description, taken in conjunction with the accompanying drawings, in which:

FIGS. 1A and 1B show the structure of a washer fluid spraying apparatus according to Embodiment 1 and the operation thereof, wherein FIG. 1A shows a case in which the amount of the remaining washer fluid in the tank is greater than a predetermined amount and FIG. 1B shows a case in which the amount of the remaining washer fluid in the tank is less than the predetermined amount;

FIGS. 7A and 7B show the structure of a washer fluid spraying apparatus according to Embodiment 3 and the operation thereof, wherein FIG. 7A shows a case in which the amount of the remaining washer fluid in the tank is greater than a predetermined amount, and FIG. 7B shows a case in which the amount of the remaining washer fluid in the tank is less than the predetermined amount;

FIGS. 8A and 8B show the structure of a washer fluid spraying apparatus according to Embodiment 4 and the operation thereof, wherein FIG. 8A shows a case in which the amount of the remaining washer fluid in the tank is greater than a predetermined amount and FIG. 8B shows a case in which the amount of the remaining washer fluid in the tank is less than the predetermined amount;

FIGS. 10A and 10B show a relevant portion of a washer fluid spraying apparatus of another example, wherein FIG. 10A shows a case in which the amount of the remaining washer fluid in the tank is greater than a predetermined amount and FIG. 10B shows the case in which the amount of the remaining washer fluid in the tank is less than the predetermined amount.

DETAILED DESCRIPTION

While the claims are not limited to the illustrated embodiments, an appreciation of various aspects of the washer fluid spraying apparatus is best gained through a discussion of various examples thereof.

A washer fluid spraying apparatus according to these embodiments comprises a window washer apparatus that sucks washer fluid W in a tank 1 by a washer pump 2 and sprays the fluid from a sucking washer nozzle 4. A remaining amount alert unit 5 alerts the driver when the amount of the remaining fluid in the tank is reduced, that is, when the operation status changes from the non-alert state where the amount the remaining washer fluid W in the tank is greater than a predetermined amount to the alert state where the amount of the remaining washer fluid W in the tank is less than the predetermined amount.

Embodiment 1

Referring to FIGS. 1 to 4, a washer fluid spraying apparatus A according to Embodiment 1 will be described below.

First the structure of the washer fluid spraying apparatus A is described.

Figure 1A:
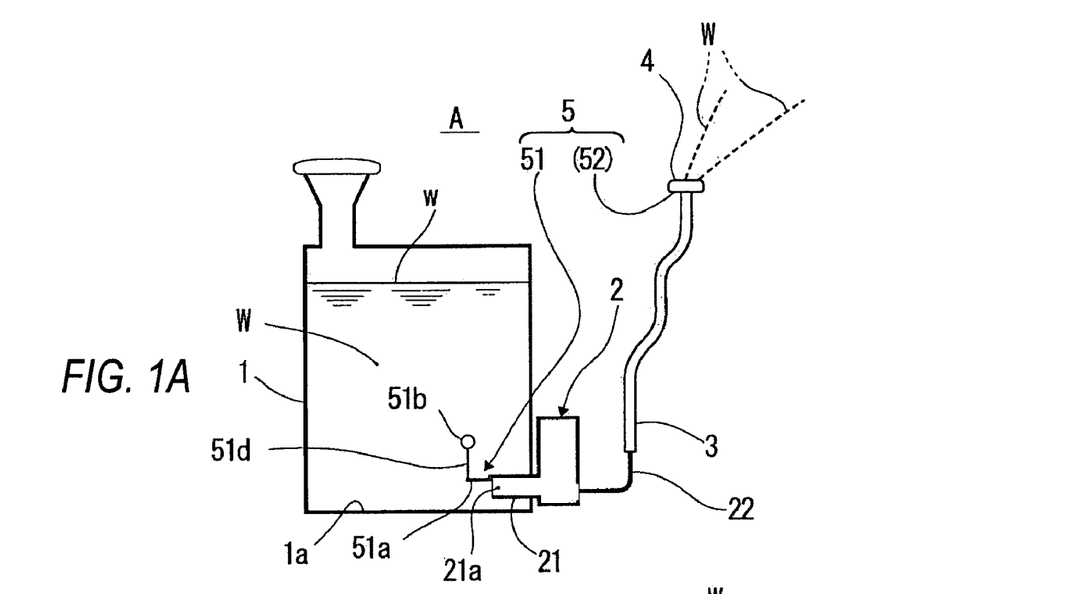
Figure 1B:
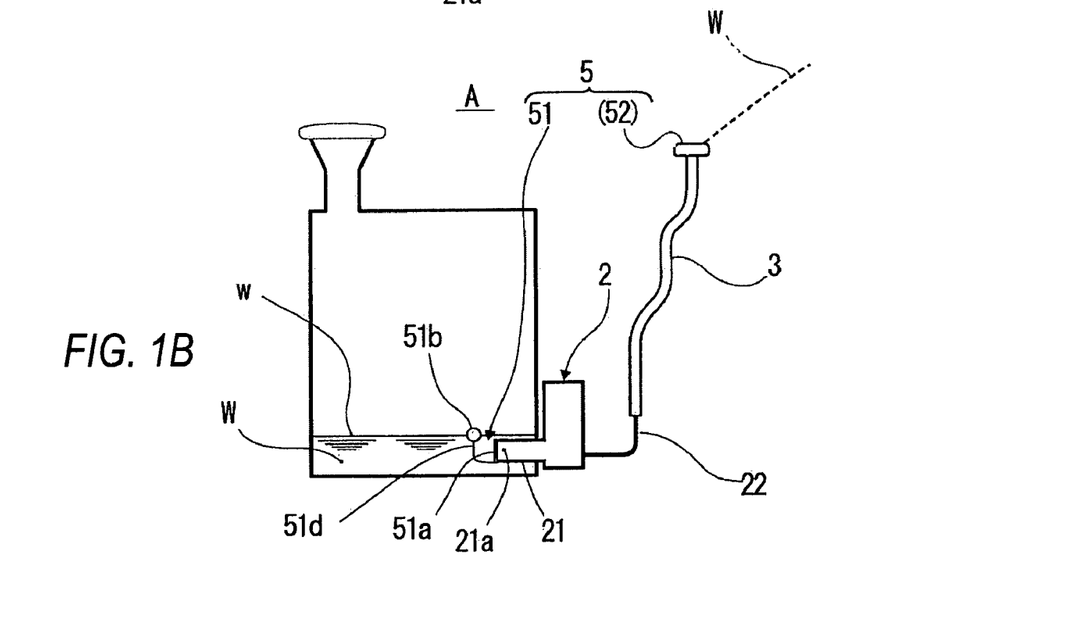

The washer fluid spraying apparatus A according to Embodiment 1 comprises, as shown in FIG. 1, a tank 1, a washer pump 2, a hose 3, a washer nozzle 4, and a spray amount controlling unit (remaining amount alert unit) 5.

The tank 1 stores the washer fluid W and is provided in the engine compartment (not shown). The washer pump 2 is provided near the bottom of the tank 1 and is driven by a motor 23 (see FIG. 4) so as to suck the washer fluid W from an inlet pipe 21 and discharge the fluid W from a discharge pipe 22. In addition, an inlet 21a at the tip of the inlet pipe 21 is open near the bottom 1a of the tank 1. The washer pump 2 is driven by operating a switch that is provided near the driver's seat (not shown) and, for example, the switch may work with a wiper apparatus (not shown).

Figure 2:
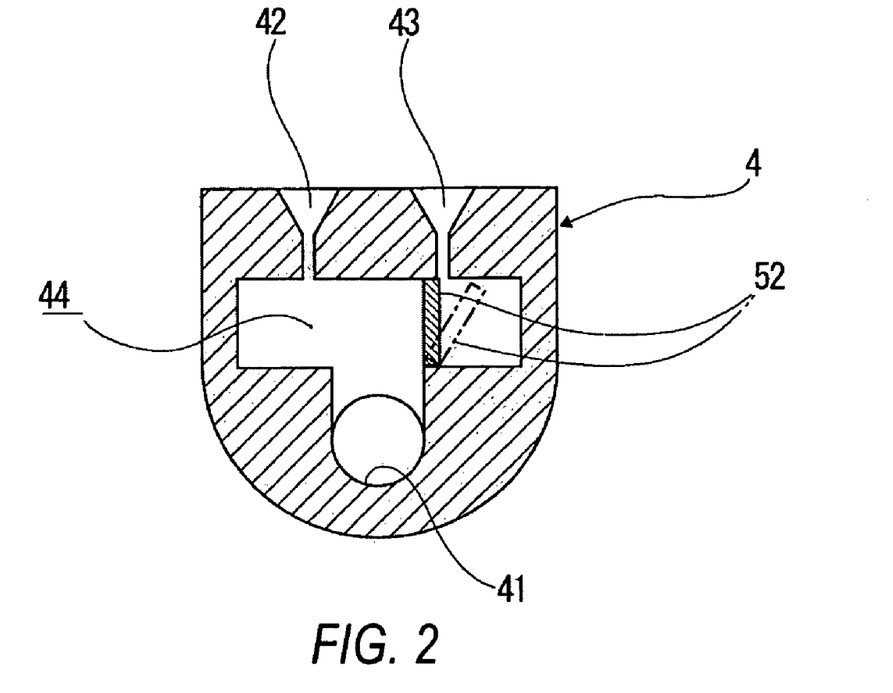
FIG. 2 is a cross-sectional view of a pressure-sensitive valve of the washer fluid spraying apparatus according to Embodiment 1.

The hose 3 is connected to the discharge pipe 22, and a washer nozzle 4 is connected to the tip of the hose 3. This washer nozzle 4 is provided on the vehicle body near the bottom of a windshield (not shown). As shown in FIG. 2, the washer nozzle 4 has an influx opening 41 where the hose 3 is connected, spray tips 42 and 43 from which the washer fluid is sprayed toward the windshield (not shown), and an intermediate chamber 44 that is provided between these spray tips 42 and 43 and the influx opening 41.

The spray amount controlling unit 5 comprises an intake amount controlling mechanism 51 that is provided at the inlet 21a, and a pressure-sensitive valve 52 that is provided in the washer nozzle 4 as a spraying condition changing mechanism.

Figure 3:
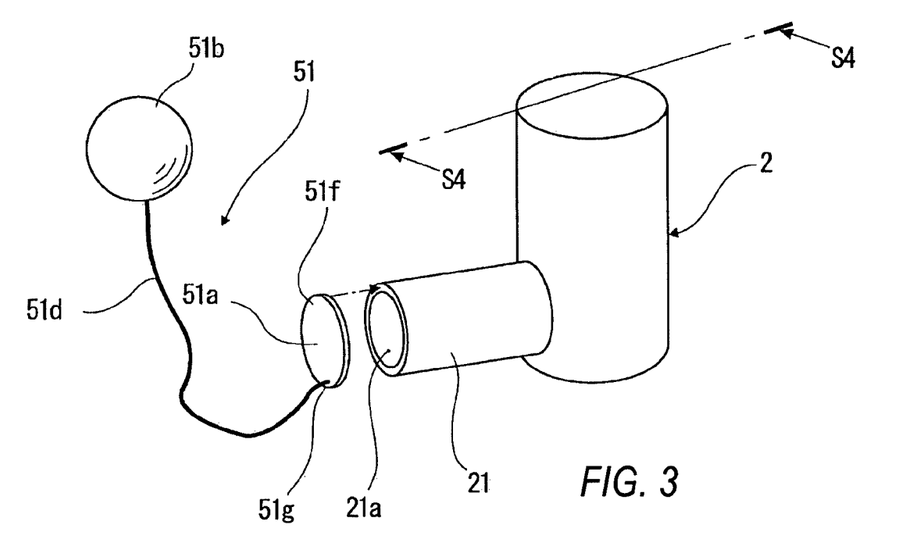
FIG. 3 is a perspective view of a relevant portion of the washer fluid spraying apparatus according to Embodiment 1.
Figure 4:
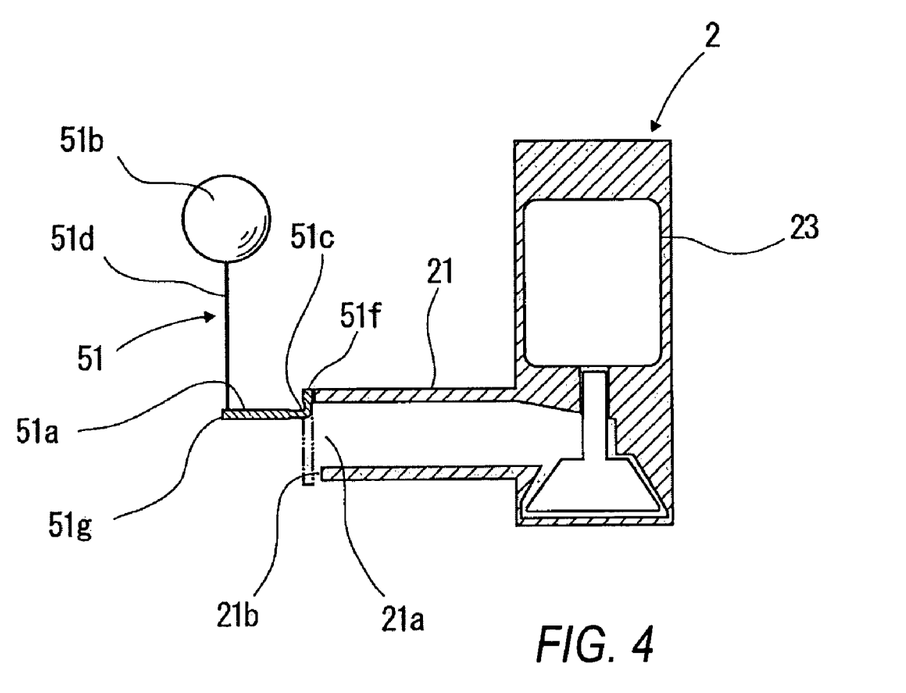
FIG. 4 is a cross-sectional view of a relevant portion of the washer fluid spraying apparatus according to Embodiment 1, taken along a line S4-S4 of FIG. 3.

The intake amount controlling mechanism 51 comprises, as shown in FIGS. 3 and 4, a valve member 51a and a float 51b. The valve member 51a is made of resin, such as EPDM resin, and is formed in a disk shape that is slightly larger than the inlet 21a which can be opened and closed, and the upper tip 51f of the valve member 51a is attached to the upper tip of the inlet pipe 21 by welding, etc.

When the valve member 51a is attached to the upper tip, the valve member 51a is in a closed state where the inlet 21a is covered with the member 51a. Near the lower portion of the inlet 21a, a notch or inclination that defines a small gap 21b, which secures a predetermined flow rate, is formed between the lower portion of the valve member 51a and the lower portion of the inlet 21a, when the bottom edge 51g of the valve member 51a is in a closed state as shown by the dot-dash lines in FIG. 4. In addition, on the upper portion of the valve member 51a, a thin hinge 51c is formed so as to open the inlet 21a in a direction in which the bottom edge 51g of the valve member 51a goes away from the inlet 21a.

The float 51b transmits the buoyant force to the valve member 51a to open the valve member 51a around the hinge 51c, and is connected to the bottom portion 51g of the valve member by a string connecting member 51d.

In other words, in the intake amount controlling mechanism 51, as shown in FIG. 1, when the amount of the remaining washer fluid W in the tank is greater than the predetermined amount, the float 51b floats and pulls the valve member 51a upward so as to open the valve. When the washer pump 2 is operated in a state where the valve member 51a is open, the normal amount of the washer fluid W is sucked from the fully opened inlet 21a and the discharge pressure becomes normal.

On the other hand, as shown in FIG. 1B, when the amount of the remaining washer fluid in the tank is reduced, the buoyant force of the float 51b does not have an effect on the valve member 51a. As a result, the valve member 51a remains closed. When the washer pump 2 is operated with such a closed state of the valve member 51a, the fluid is sucked only from the small gap 21b and the amount of the intake fluid is reduced compared to the normal state. The discharging pressure of the washer pump 2 is reduced so as to be lower than the normal fluid pressure.

The fluid surface level w of the washer fluid W in the closed state of the valve member 51a is set at a predetermined level based on the size of the float 51b and the length of the string connection member 51d.

The pressure-sensitive valve 52 is provided as the spraying condition changing mechanism that changes the amount of the sprayed fluid according to the discharge fluid pressure from the washer pump 2, and as shown in FIG. 2, it is provided between the influx opening 41 and the other spray tip 43 in the intermediate chamber 44 of the washer nozzle 4. This pressure-sensitive valve 52 also has a plate spring so as to close the path between the influx opening 41 and the spray tip 43 when it is not elastically deformed, and so as to open the path when it is elastically deformed.

In other words, the pressure-sensitive valve 52 is operated according to the discharge fluid pressure from the washer pump 2. When the discharge fluid has a normal fluid pressure, the path is opened through the elastic deformation, as shown in dot-dash lines, so as to allow the sprayed washer fluid from both spray tips 42 and 43. On the other hand, when the discharge fluid pressure from the washer pump 2 is reduced, the path is closed because it is not elastically deformed. Accordingly, the washer fluid W can be sprayed only from the spray tips 42 and 43.

Next, an operation of Embodiment 1 will be described below.

As shown in FIG. 1A, when there is a large amount of washer fluid remaining in the tank, the valve member 51a is open due to the buoyant force of the float 51b of the intake amount controlling mechanism 51. When the washer pump 2 is driven in this opening state, the inlet 21a is fully opened, the normal amount of fluid is taken in, and the discharge fluid pressure becomes normal. Therefore, the pressure-sensitive valve 52 is opened in the washer nozzle 4, and the washer fluid W is sprayed from the two spray tips 42 and 43. The condition in which the washer fluid W is sprayed from the two spray tips 42 and 43 is defined as the non-alert condition.

In contrast, as shown in FIG. 1B, when the amount of the remaining washer fluid W in the tank becomes low, the position of the float 51b of the intake amount controlling mechanism 51 is lowered along with the change of the fluid surface level w, so that the valve member 51a is closed.

When the washer pump 2 is driven in the closing state, only a small gap 21b is open at the inlet 21a and the intake amount is limited, compared to the normal fluid amount and therefore the discharge fluid pressure is reduced. Consequently, the pressure-sensitive valve 52 at the washer nozzle 4 is closed so that the washer fluid W is sprayed only from the spray tip 42. As described above, the condition in which the washer fluid W is sprayed only from the spray tip 42 is defined as the alert condition.

As described above, according to Embodiment 1, the spraying state of the fluid at the washer nozzle 4 changes from the non-alert state in which the washer fluid is sprayed from both spray tips 42 and 43 to the alert condition in which it is sprayed only from the spraying tip 42, and the driver can be informed that the amount of the remaining washer fluid W in the tank is reduced compared to the normal fluid amount. In particular, in Embodiment 1, since the number of spray tips 42 and 43 from which the washer fluid W is sprayed is reduced from two to one, the driver can be more clearly informed that the remaining amount in the tank is reduced than in case where the amount of the sprayed fluid is merely reduced.

In addition, as described above, when the remaining amount in the tank is reduced, the discharging amount by the washer pump 2 is reduced because the valve member 51*a* is closed and the inlet 21*a* is blocked, and consequently, the usage period of the small amount of the remaining washer fluid W can be extended compared to the case of the normal state in which the fluid is sprayed from both the spray tips 42 and 43.

Furthermore, according to Embodiment 1, as described above, the amount of the sprayed fluid from the washer nozzle 4 is changed by the intake amount controlling mechanism 51 that mechanically limits the intake amount using the float 51*b* and the pressure-sensitive valve 52 that changes the spraying amount using spray tips 42 and 43 by mechanically responding to the changes in the discharge pressure of the washer pump 2. Therefore, the manufacturing cost can be reduced, compared to the conventional apparatuses that use a fluid level sensor or a control circuit that changes the driving condition of the washer pump according to a result detected by the fluid level sensor.

Embodiment 2

Figure 5:
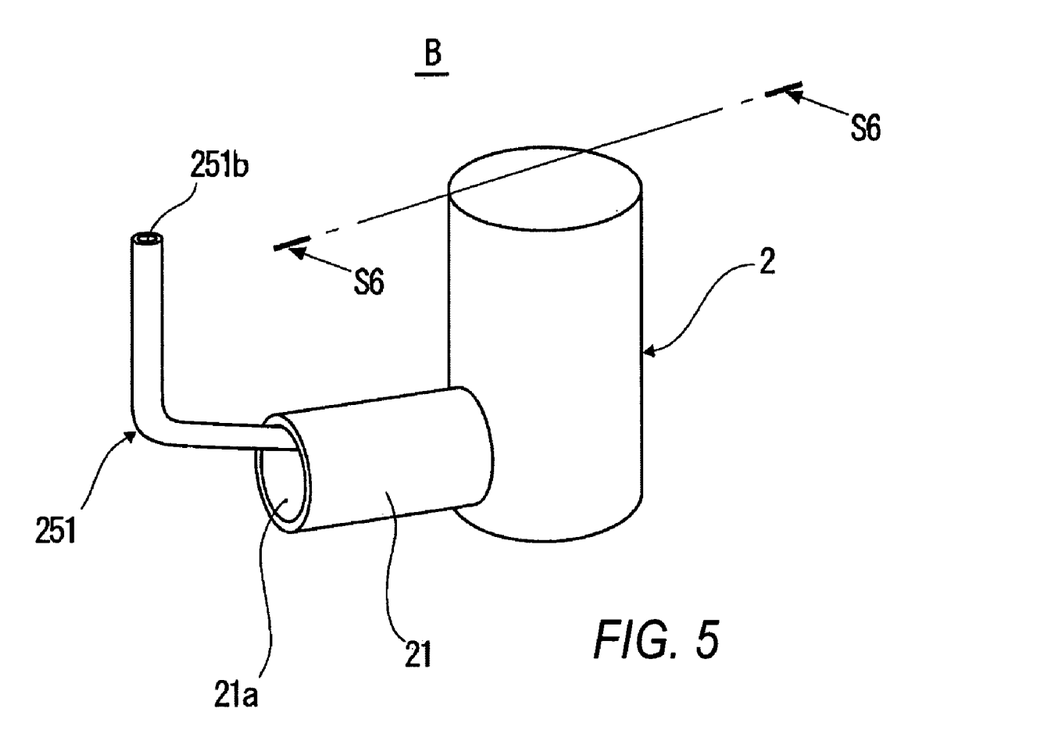
FIG. 5 is a perspective view of a relevant portion of a washer fluid spraying apparatus according to Embodiment 2.
Figure 6:
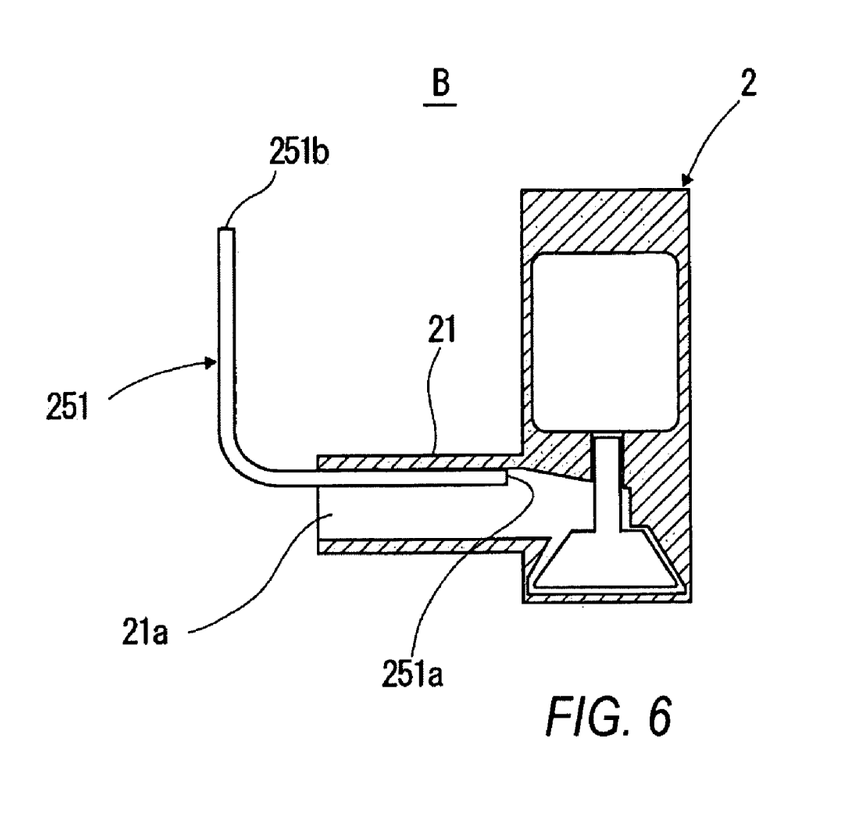
FIG. 6 is a cross-sectional view of a relevant portion of the washer fluid spraying apparatus according to Embodiment 2, taken along a line S6-S6 of FIG. 5.

Next, the washer fluid spraying apparatus B according to Embodiment 2 will be described below referring to FIGS. 5 and 6.

The same numerals are assigned to elements identical or equivalent to Embodiment 1 and primarily the different portions are described.

The washer fluid spraying apparatus B according to Embodiment 2 has a bent pipe 251 as an intake amount controlling mechanism (remaining amount alert unit).

The bent pipe 251 has an opening 251*a* (FIG. 6) placed inside the inlet pipe 21 and an opening 251*b* which is arranged so as to be exposed above the fluid surface w of the washer fluid W when the remaining amount in the tank is reduced by more than the predetermined amount, and the mechanism is formed in an approximately L shape.

In Embodiment 2, the structure other than the intake amount controlling mechanism is the same as that of Embodiment 1.

Next, an operation of Embodiment 2 will be described below.

When there is a plentiful amount of remaining washer fluid in the tank 1 (in the condition in FIG. 1A), the opening 251*b* of the bent pipe 251 is positioned in the washer fluid W. When the washer pump 2 is driven in the state, the washer pump 2 sucks the washer fluid W from the inlet 21*a* and the bent pipe 251. Therefore, since the washer pump 2 sucks the normal amount of fluid and the discharge fluid pressure becomes normal, the pressure-sensitive valve 52 at the washer nozzle 4 is opened, and becomes the non-alert state in which the washer fluid W is sprayed from the two spray tips 42 and 43.

When the amount of remaining washer fluid in the tank becomes low, along the change of the fluid surface level w of the washer fluid W, the opening 251*b* of the bent pipe 251 is exposed in the air above the fluid surface w. When the washer pump 2 is driven in the state, the washer pump 2 starts sucking air from the bent pipe 251 and the intake amount of the washer fluid is reduced, compared to the normal fluid amount and the discharge fluid pressure is also reduced so that the pressure-sensitive valve 52 of the washer nozzle 4 is closed so as to enter the alert state in which the washer fluid W is sprayed only from the spray tip 42.

Therefore, as in Embodiment 1, the driver can be alerted that the amount of the remaining washer fluid W in the tank is reduced. In addition, the usage period of the small amount of remaining washer fluid W can be extended.

Furthermore, in Embodiment 2, the bent pipe 251 is used as the intake amount controlling mechanism and the structure thereof can be simplified thereby reducing the manufacturing cost. An optimum diameter is selected so as to allow the proper intake and the discharge fluid pressure for the washer pump 2 when the amount of the remaining washer fluid W in the tank is reduced.

Embodiment 3

Next, the washer fluid spraying apparatus C according to Embodiment 3 will be described, referring to FIGS. 7A and 7B.

The same numerals are assigned to elements identical or equivalent to those of the other embodiments, and primarily the different portions are described.

Embodiment 3 is an example in which a reflux switching mechanism 330 is used as a spray amount controlling unit, which is an example of the remaining amount alert unit.

This reflux switching mechanism 330 comprises a reflux passage 331 and a float valve (check valve) 332. The reflux passage 331 is a pipe that connects the discharge pipe 332, which is on the outlet side of a washer pump 302, and a tank 301. On the tank side opening of this reflux passage 331, a discharge nozzle 333 that discharges the washer fluid W into the tank 301 is provided. The float valve 332 is provided so as to rotate around a shaft 334, near an opening 333*a* of the discharge nozzle 333, thereby opening and closing the opening 333*a*.

Figure 7A:
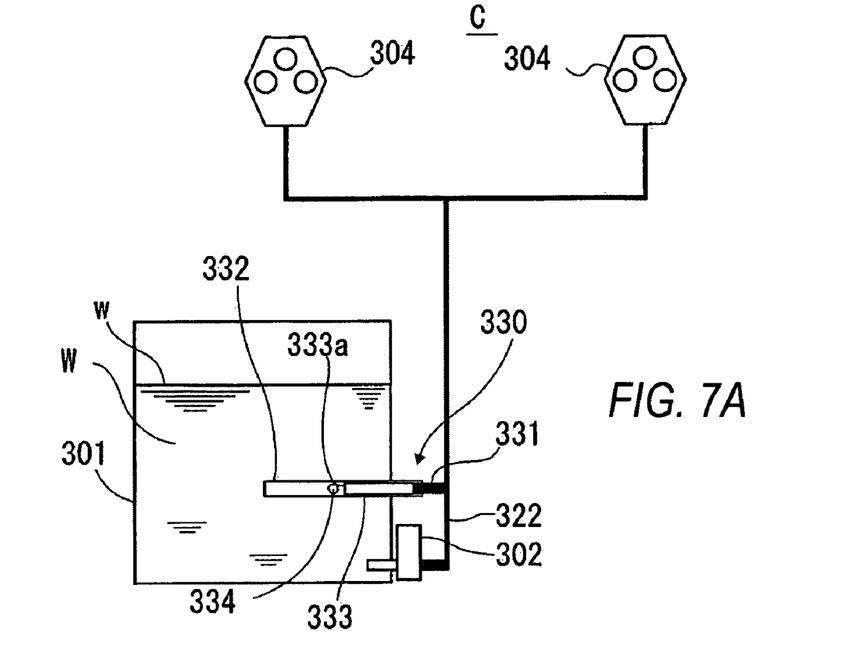

In other words, the float valve 332 is formed so that buoyancy is generated in the washer liquid W, and as shown in FIG. 7A, when the amount of the remaining fluid in the tank is such that the fluid surface level w of the washer fluid W is higher than the float valve 332, then the float valve 332 floats and covers the opening 333*a* of the discharge nozzle 333. The rotational movement of the float valve 332 is limited so that it does not go beyond the position where it covers the opening 333*a*.

Figure 7B:
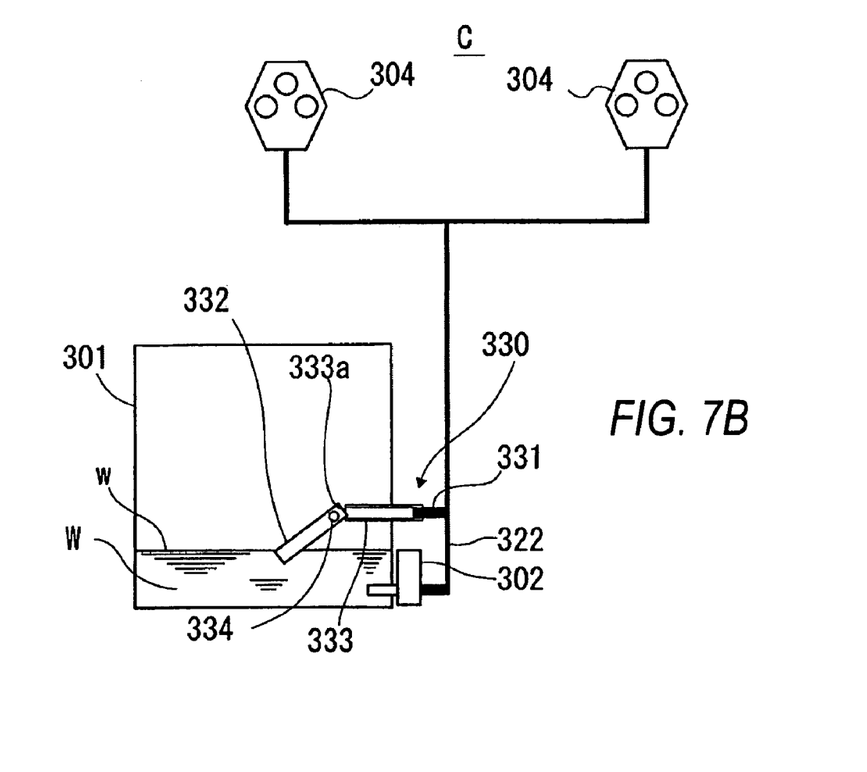

On the contrary, as shown in FIG. 7B, when the amount of the remaining fluid in the tank is such that the liquid surface level w is lower than the discharge nozzle 333, the float valve 332 is rotated downwards by its weight, and then the opening 333*a* of the discharge nozzle 333 is opened. The discharge pipe 322 of the washer pump 302 is connected to the washer nozzles 304 and 304.

Next, an operation of Embodiment 3 will be described below.

When the amount of the remaining washer fluid W in the tank 301 is greater than the predetermined amount, as shown in FIG. 7A, the opening 333*a* of the discharge nozzle 333 is closed by the float valve 332. Therefore, when the washer pump 302 is operated, the washer fluid W does not flow or hardly flows through the reflux passage 331, the fluid pressure in the discharge pipe 322 becomes normal, and the washer fluid W is sprayed from the washer nozzles 304 and 304 with a burst. This spraying condition is the non-alert state.

In contrast, when the amount of the remaining washer fluid W in the tank becomes less than the predetermined amount and the fluid surface level w becomes lower than the discharge nozzle 333, as shown in FIG. 7B, the float valve 332 rotates downwards and the opening 333a of the discharge nozzle 333 is opened, thereby allowing the washer fluid W to flow through the reflux passage 331.

When the washer pump 2 is operated under this condition, a portion of the washer fluid W that flows through the discharge pipe 322 returns to the tank 301 through the reflux passage 331. Therefore, the discharge fluid pressure in the discharge pipe 322 is lowered and the amount of the washer fluid W to be discharged from the washer nozzles 304 and 304 is reduced. This condition in which the amount of the sprayed fluid is reduced is the alert state.

Therefore, the amount of the sprayed fluid from the washer nozzles 304 and 304 is different from that to be normally sprayed, and as in Embodiment 1, the driver can be alerted that the amount of the remaining washer fluid W in the tank is reduced. In addition, the usage period of the small amount of remaining washer fluid W can be extended because the amount of the sprayed washer fluid W from the washer nozzle 304 is reduced.

According to Embodiment 3, the amount of the sprayed fluid from the washer nozzle 304 is changed when the amount of the remaining washer fluid W in the tank is reduced by mechanically opening and closing the opening 333a according to the fluid surface level w using the float valve 332. Therefore, it allows inexpensive manufacturing, compared to the conventional apparatuses that use a fluid amount sensor or a control circuit that changes the driving condition of the washer pump according to a result detected by the fluid amount sensor.

Embodiment 4

Next, the washer fluid spraying apparatus D according to Embodiment 4 will be described below, referring to FIGS. 8 and 9.

In this embodiment, the same numerals are assigned to elements identical or equivalent to the other embodiments, and primarily the different portions are described.

Embodiment 4 is an example in which an alert sound generation mechanism 430 is used as a remaining amount alerting unit.

Figure 8A:
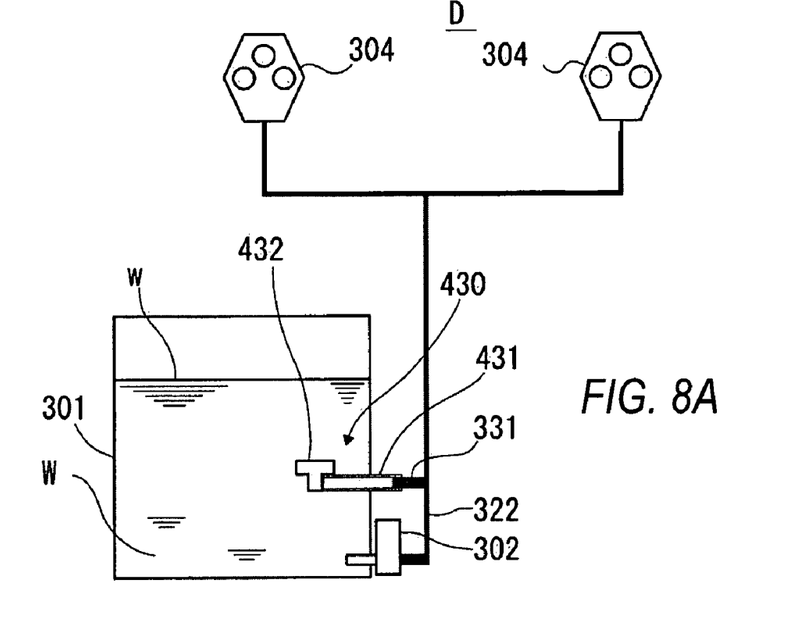
Figure 8B:
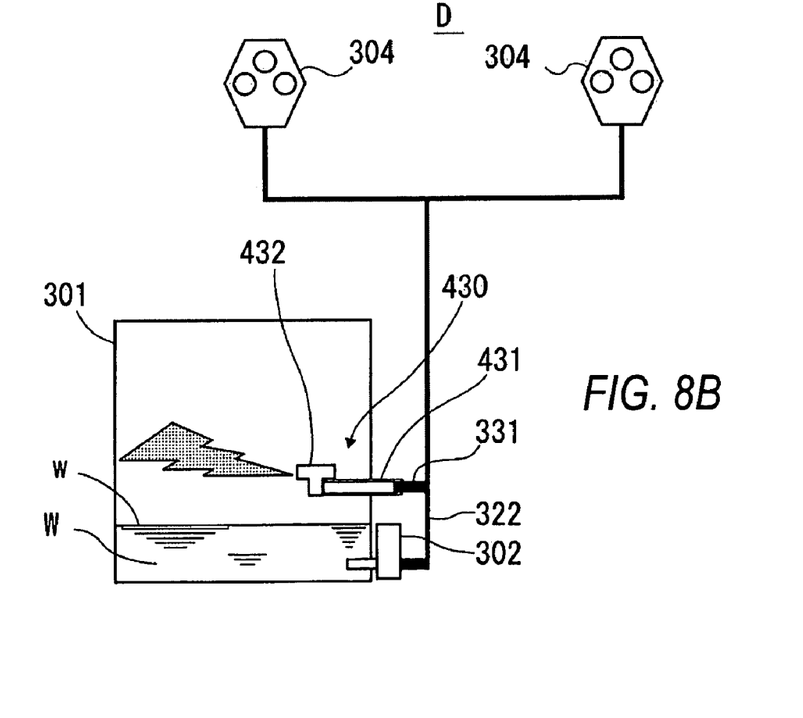

The alert sound generation means 430, as shown in FIG. 8, comprises the reflux passage 331, which is described in Embodiment 3, a discharge nozzle 431 that is attached to the reflux passage 331, and a sound member 432 that is attached to the discharge nozzle 431.

Figure 9:
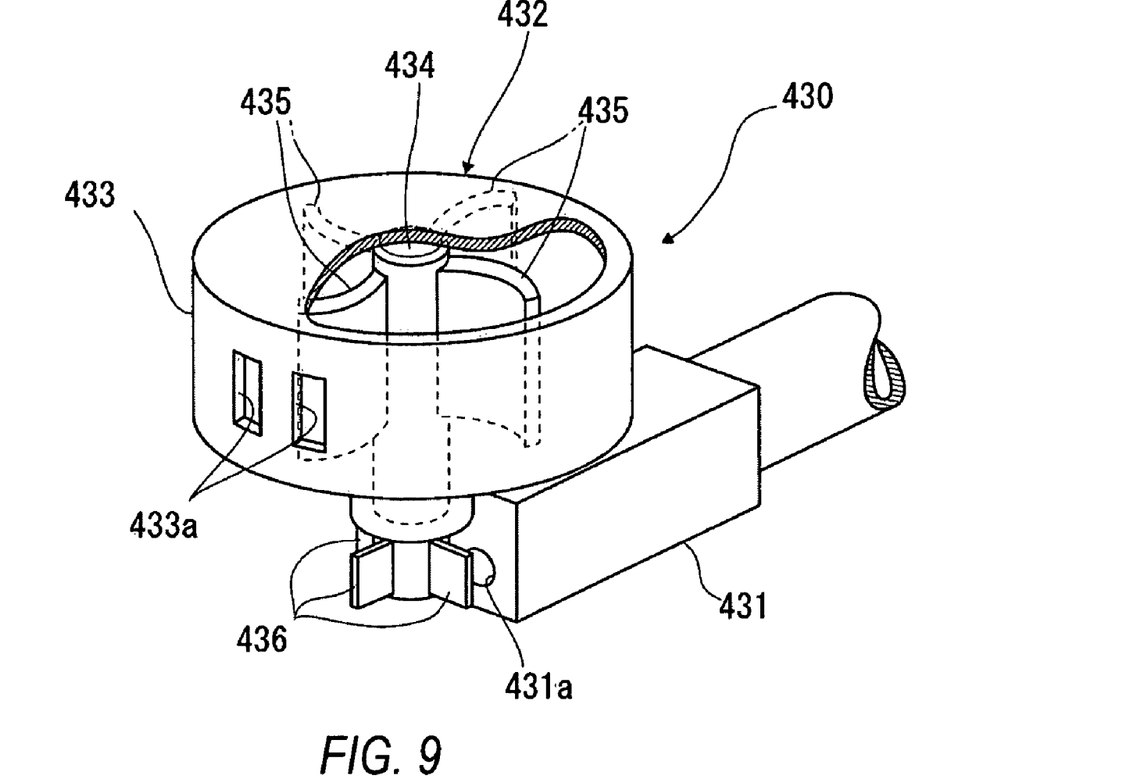
FIG. 9 is a perspective view of a relevant portion of the washer fluid spraying apparatus according to Embodiment 4.

The sound member 432, as shown in FIG. 9, comprises a barrel-shaped casing 433 and a rotation shaft 434 that is supported by the casing 433 so as to rotate. In addition, at upper and lower portions of the rotation shaft 434, four sound blades 435 and four input blades 436 are integrally formed therewith. The input blades 436 are provided in front of a discharge hole 431a of the discharge nozzle 431. Therefore, when the washer fluid W is discharged from the discharge hole 431a of the discharge nozzle 431, the input blades 436 receive pressure so that the rotation shaft 434 is rotated.

In addition, since the sound blades 435 are contained in the casing 433, and whistling holes 433a and 433a are formed on the circumference of the casing 433, when the rotation shaft 434 is rotated and an air flow is formed in the casing 433 by the sound blades 435, a warning sound is generated by the compressed air flow at the whistling holes 433a and 433a.

Next, an operation of Embodiment 4 will be described below.

When the washer pump 302 is operated, part of the washer fluid W that is discharged from the discharge pipe 322 is returned to the tank 301 via the reflux passage 331. At that time, at the sound member 432, the input blade 436 receives the pressure due to the discharge of the washer fluid W so that the rotation shaft 434 is rotated.

When the amount of the remaining washer fluid W in the tank is such that, as shown in FIG. 8A, the sound member 432 is under the surface of the fluid, even if the sound blades 435 are rotated, the sound blades receive resistance due to the washer fluid in the tank 301. The rotation speed thereof is not accelerated, so that an air flow is not formed. Therefore, no alerting sound is generated at the whistling holes 433a. In other words, this is the non-alert state when the alerting sound is not generated.

On the contrary, when the amount of the remaining washer fluid W in the tank is such that, as shown in FIG. 8A, the sound member 432 is above the fluid surface w, the sounding blades 435 do not receive resistance by the washer fluid W in the tank 301, and therefore the rotation shaft 434 is rotated at a high speed. An air flow is generated due to the rotation of the sound blades 435 in the casing 433, and the alerting state begins when the alerting sound is generated at the whistling holes 433a.

Therefore, by the alerting sound generated by the sounding member 432, the driver can be alerted when the amount of the remaining washer fluid W in the tank is reduced.

In addition, according to Embodiment 4, as described above, the alerting sound is generated based on the change in the operation status of the sound member 432 according to the fluid surface level w when the amount of the remaining washer fluid W in the tank is reduced. Therefore, it allows inexpensive manufacturing compared to the conventional apparatuses that use a fluid amount sensor or a control circuit that changes the operational condition of the alerting light according to what is detected by the fluid amount sensor.

As described above, although Embodiments 1 to 4 are described in detail by referring to the drawings, the concrete structure is not limited to those described in Embodiments 1 to 4 and design modifications that do not deviate from the objective of the present invention can be made. In other words, although Embodiments 1 to 4 show the structure in which the washer fluid is sprayed onto the windshield as a washer spraying device, it can be applied to other windows such as a rear window.

In addition, Embodiments 1 and 2 are examples that comprise the intake amount controlling mechanism 51 (251) as the spray amount controlling unit, and the pressure-sensitive valve 52 as a spraying condition modification mechanism. However, the structure having only an intake amount controlling mechanism 51 (251) can be provided without having the spraying condition modification mechanism (pressure-sensitive valve 52). Even with such a structure, when the amount of the remaining washer fluid W in the tank is reduced, the amount of the fluid to be spray from the washer nozzle 4 can be reduced, and the driver can be alerted that the amount of the remaining washer fluid in the tank is reduced.

In addition, although in the intake amount controlling mechanism 51, the valve member 51a is made of resin, it can be made of other materials such as rubber or metal.

Furthermore, at least one orifice can be formed in the valve member 51a or inlet pipe 21 instead of a small gap 21b as a means to secure the designated flow rate, so as to limit the intake of the washer pump 2 by covering the inlet 21a by the valve member 51a. Moreover, a gap can be formed between the circumference of the valve member 51a and the inlet 21a by the valve member 51a having a smaller diameter than the inlet 21a.

The method of attaching the valve member 51a to the inlet 21a is not limited to welding as in Embodiment 1, and it can be attached using a hinge member, etc.

The structure of the valve member 51a is not limited to one that opens and closes the inlet 21 by rotating around at the hinge portion 51c. For example, other structures can be used such as a means for opening and closing the inlet by sliding the member in the up and down directions. In addition, although the valve member 51a is attached on the inlet 21a, it can be provided in the middle of the inlet pipe 21. Although the float 51b is provided as a member separated from the valve member 51a, it can be integratedly formed with the valve member 51a. Furthermore, two or more inlets may be provided at different heights so that the washer pump 2 carries out the intake through these inlets, and a valve member may be provided on one of the inlets which is located at a higher position so that when the fluid surface level w becomes lower than the inlet located the higher position, the valve member covers the inlet so that the intake is allowed only from the inlet at the lower position.

Figure 10A:
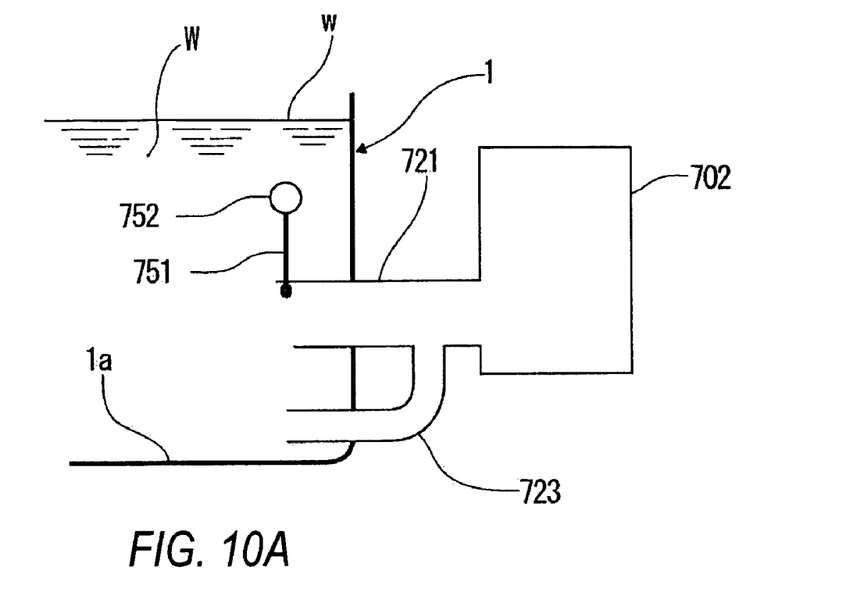
Figure 10B:
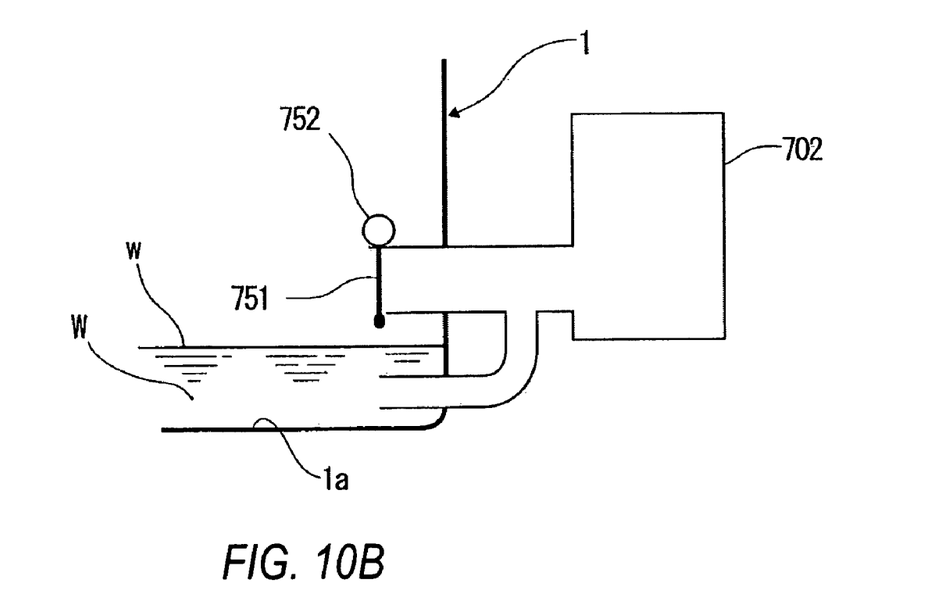

An example of such a washer fluid spraying apparatus is shown in FIGS. 10A and 10B. Two inlet pipes 721 and 723 are provided on the inlet side of a washer pump 702. The inlet pipe 723 is provided near the bottom 1a of the tank 1, and in contrast, the inlet 721 is provided at a higher position. A valve member 751, with which a float 752 which is integratedly formed, is attached to the inlet pipe 721 so that it can slide up and down.

As shown in FIG. 10A, when the fluid surface level w of the washer fluid W is high, the valve member 751 floats and opens the inlet of the inlet pipe 721. Therefore, the washer pump 702 sucks the washer fluid W from both inlet pipes 721 and 723. When the fluid surface level w of the washer fluid W become lower, as shown in FIG. 10B, the valve member 751 covers the inlet, so that and the washer pump 702 sucks the fluid only from the inlet pipe 723, and the spraying fluid pressure and the amount of the sprayed fluid are reduced.

In addition, although the washer nozzle 4 according to Embodiments 1 and 2 has two spray tips 42 and 43, the number of spray tips is not limited to two; three or a greater number thereof can be formed. When three or more spray tips are formed, the pressure-sensitive valve 52 can close one or two or more spray tips among the three or more spray tips.

Although Embodiments 1 and 2 show examples that close the spray tip when the discharge fluid pressure of the washer pump is reduced, as described as the spraying condition modification unit, it is not limited thereto, and as long as the spraying condition is different from that in the normal time, when the discharge fluid pressure of the washer pump is reduced, any structure thereof is acceptable. For example, the washer fluid can be intermittently sprayed while a pinwheel valve is rotated when the discharge fluid pressure is normal, and on the other hand, the washer fluid is sprayed continuously while the rotation of the valve is stopped when the discharge fluid pressure of the washer pump is reduced.

Although Embodiment 3 shows an example in which the pressure-sensitive valve 52 is not used for the washer nozzle 304, as in Embodiments 1 and 2, the pressure-sensitive valve 52 can be provided and the number of the spray tips may be changed depending on the changes in the discharge pressure of the washer pump 302.

In addition, instead of the float valve 332 in Embodiment 3, the valve member 751 and the float 752 that are shown in FIG. 10 can be used.

Furthermore, the alert sound generation mechanism 430 according to Embodiment 4 and the spray amount control mechanism 5 and the intake amount control mechanism 51 according to Embodiments 1 and 2 can be provided together so that when the remaining amount in the tank is reduced, the amount of the sprayed fluid is reduced while an alerting sound is generated.

The preceding description has been presented only to illustrate and describe exemplary embodiments of the apparatus of the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope. The scope of the invention is limited solely by the following claims.

What is claimed is:

1. A washer fluid delivery apparatus comprising:
   a tank for storing washer fluid;
   a washer pump fluidly coupled to the tank by an inlet conduit, the washer pump configured to suck the washer fluid from the tank and to discharge the washer fluid;
   a washer nozzle having a plurality of spray tips configured to deliver the washer fluid to a windshield and having a pressure-sensitive valve operable to move between a high-pressure position in which the spray tips are open and a low-pressure position in which at least one of the spray tips is open and at least one of the spray tips is closed;
   a valve member coupled to the inlet conduit and moveable between an open position and a closed position, wherein a cross-sectional area of a the inlet conduit is greater when the valve is in the open position than when the valve is in the closed position; and
   a float coupled to the valve member and configured to, in response to a buoyant force, move the valve member between the first position and the second position,
   wherein the pressure-sensitive valve is configured to move between the high-pressure position and the low-pressure position in response to a position of the valve member.

2. A washer fluid delivery apparatus according to claim 1 wherein the inlet conduit of the washer pump has a gap when the valve member is in the closed position.

3. The washer fluid delivery apparatus according to claim 1,
   wherein the washer pump is configured to pump less washer fluid to the washer nozzle when the valve member is in the closed position than when the valve member is in the open position.

4. The washer fluid delivery apparatus according to claim 3 wherein the washer nozzle includes a spring configured to bias the pressure-sensitive valve toward the low-pressure position when the pressure-sensitive valve is in the high-pressure position.

5. A washer fluid delivery method, comprising:
   sucking washer fluid from a tank and discharging the sucked washer fluid using a washer pump;

delivering the washer fluid toward a windshield from a washer nozzle having multiple spray tips;

changing a cross-sectional area of a flow passage at an inlet of the washer pump according to the amount of the remaining washer fluid in the tank, using buoyant force; and in response to the cross-sectional area of the flow passage, biasing a pressure-sensitive valve in the washer nozzle between a high-pressure position in which the spray tips are open and a low-pressure position in which at least one of the spray tips is open and at least one of the spray tips is closed.

6. A washer fluid delivery apparatus comprising:

a washer pump configured to suck washer fluid through an inlet conduit from a washer fluid source and to discharge the washer fluid;

a washer nozzle in fluid communication with the washer pump, the washer nozzle including multiple spray tips configured to deliver the washer fluid toward a windshield and including a pressure-sensitive valve configured to move between a high-pressure position in which the spray tips are open and a low-pressure position in which at least one of the spray tips is open and at least one of the strap tips is closed; and a delivery amount control device configured to vary a cross-sectional area of the inlet conduit of the washer pump in response to an amount of the remaining washer fluid in the washer fluid source.

\* \* \* \* \*